Patented Feb. 28, 1928.

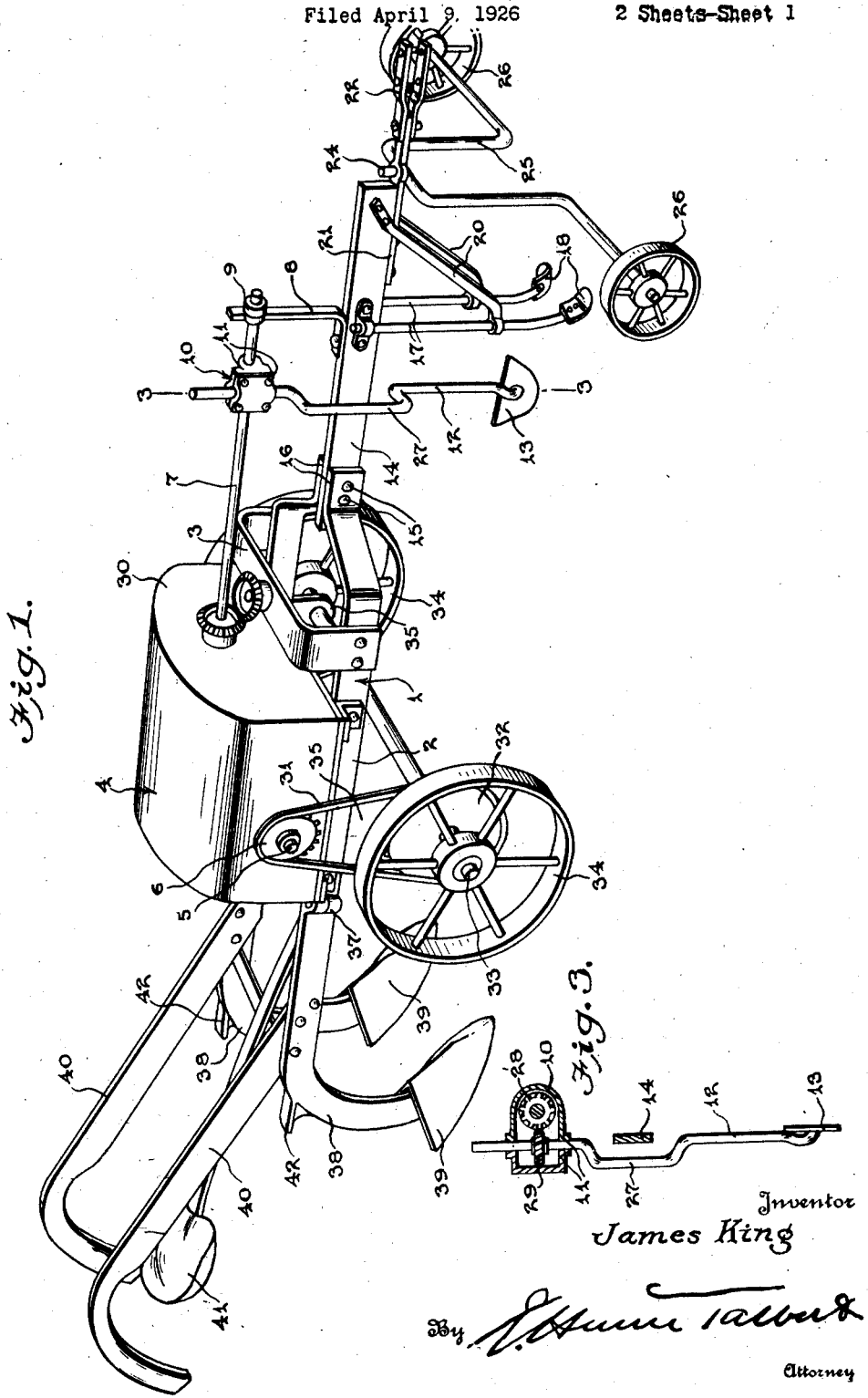

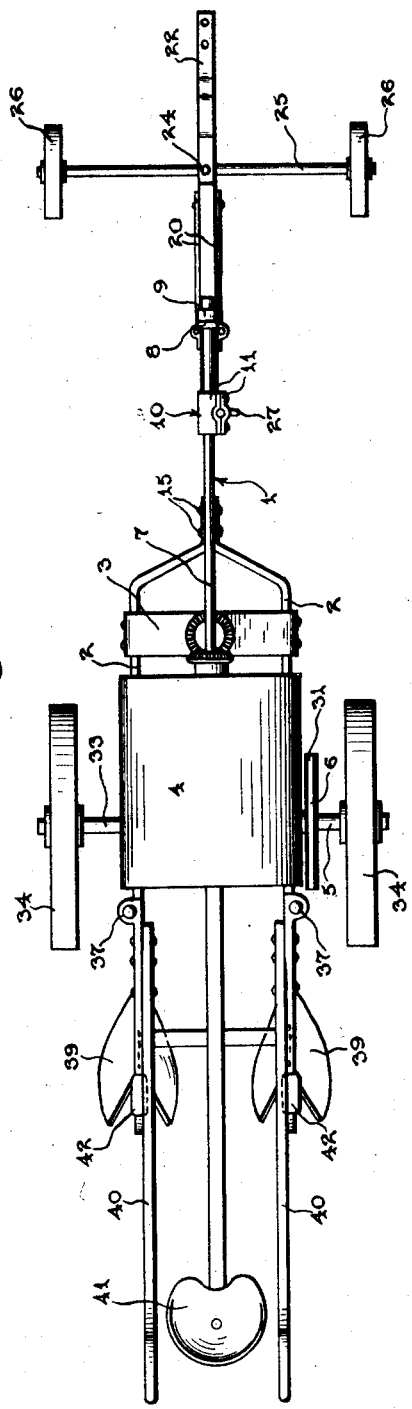

1,661,122

UNITED STATES PATENT OFFICE.

JAMES KING, OF KANSAS CITY, MISSOURI.

COMBINATION COTTON THINNING AND CULTIVATING MACHINE.

Application filed April 9, 1926. Serial No. 100,881.

It is a purpose of the present invention to provide an improved machine of this character including a frame with a driven shaft thereon having a cotton topper or thinning member suspended thereon and driven thereby, whereby the shank of said member may have a rotary motion, the shank of the member having a crank for cooperation with the frame of the machine to impart a lateral swinging movement to the topper or thinning member, so that as it rotates it may have a shearing action on the tops of the cotton plants.

Another purpose is to provide the machine with cultivating devices, such as plows, for operation on opposite sides of the row of cotton plants, the standards of the plows being adjustable due to universal joints, so as to position the plows relative to each other and to the row of cotton plants. In other words, the plows may be moved toward each other, or one or the other moved independently with relation to the opposite one, so that in using a machine of this construction, the soil on opposite sides of the row of cotton plants may be turned and cultivated with substantial efficiency.

Still another purpose is to provide cultivators in advance of the cotton topper or thinner and operating on opposite sides of the row of plants.

A further purpose is to provide a machine of this kind which may be driven by motive power on the frame, or operated through the medium of draft animals.

The invention comprises further features and combinations of parts as hereinafter set forth, shown in the drawings and claimed.

In the drawings:

Figure 1 is a view in perspective, showing the improved combination cotton thinner and cultivating machine constructed in accordance with the invention.

Figure 2 is a plan view of the same.

Figure 3 is a vertical transverse sectional view on line 3—3 of Figure 1, more clearly showing the cooperation of the crank formed in the shank of the topper with the side of the frame to impart lateral movements to the topper or thinning member which is in the form of a blade.

Figure 4 is a view in side elevation, with the supporting driving wheels shown in the previous figures omitted, illustrating how the machine can be drawn by draft animals.

Referring to the drawings, 1 designates a frame which comprises side bars 2 which are relatively braced by the arched plate 3, and mounted upon the sides of the frame 1 is a casing 4 having therein a conventional type of internal combustion motor (not shown). This motor carries a shaft 5 with a sprocket wheel 6 thereon, the motor also including a second shaft 7 which projects from the casing and is mounted in an upstanding bearing 8, with a collar 9 on the shaft to prevent longitudinal movement of the shaft in one direction Mounted upon the shaft 7 is a hanger 10 in the form of a boxing comprising opposed plates 11 between which the shaft 7 and the shank 12 of the thinning or cotton topping blade 13 are mounted. An extension tongue 14 is secured at 15 between the ends 16 of the side bars of the frame. This extension tongue protrudes forwardly a substantial distance and carries on opposite sides the shanks 17 of the shovels 18. These shovels operate upon opposite sides of the row of cotton plants, tending to initially break up and cultivate the soil. The shanks 17 are reinforced by the braces 20 which are secured to the opposite sides of the extension tongue and are in turn connected to the shanks of the shovels, thereby preventing any rearward movement of the shanks during the action of the shovels on opposite sides of the row of plants.

The extreme end of the extension tongue has a coupling plate 21 connected to it and to which a clevis 22 is operatively connected for the purpose of attaching draft animals to the machine. Swivelly supported at 24 on the coupling plate is the upper end of an arched axle 25 carrying forward supporting wheels 26. The shank 12 of the thinning blade or topper 13 has a crank 27 formed therein which is so positioned relative to the side of the extension tongue that when the shank rotates, this crank will automatically engage and cause a lateral swinging movement to be imparted to the shank of the blade or thinner. The boxing 10 on the shaft 7 carries interiorly the spiral gears 28 and 29 which cause a rotary movement to be imparted to the shank 12 through the medium of the shaft 7 which is operated by the motor which is housed by a casing 4.

A sprocket chain 31 engages about the sprocket 6 and in turn passes around a sprocket 32 carried by the axle or shaft 33 on which supporting drive wheels 34 are mounted, the axle 33 being journaled in depending bearings 35 carried by the side bars of the frame 1. The side bars of the frame 1 extend a short distance rearwardly of the casing or housing of the motor and connected to them by means of universal joints 37 are plow standards 38 carrying plows 39 which operate on opposite sides of a row of plants.

Handles 40 are carried by the plow standards and are adapted to be manipulated by an operator who uses the seat 41. By actuating the handles as may be desired, the plow standards may be raised or lowered, thereby raising or lowering the plows, or the plows may be moved toward and from each other relative to the opposite sides of the row of cotton plants. The plow standards have rearwardly positioned foot engaging elements 42, so that the operator may exert pressure thereon and keep the plows steady to their work.

When the supporting wheels and the sprockets are dispensed with, as in Figure 4, the plow standards remain stationary for the reason that they may form integral parts of the side of the frame 1, otherwise the machine operates the same as it does in Figures 1 and 2.

The invention having been set forth, what is claimed is:

1. A combined cotton chopper and cultivator, comprising a frame and a driven shaft on the frame, a cotton chopper implement with a shank pivotally suspended from and operatively connected to the shaft for rotating the shank, and means to impart lateral movements to the shank of said implement.

2. A combined cotton chopper and cultivator comprising a frame and a driven shaft on the frame, a cotton chopper implement with a shank pivotally suspended from and operatively connected to the shaft for rotating the shank, and means to impart lateral movements to the shank of said implement, said means comprising a crank formed in the shank of the cotton topping implement and designed for cooperation against the side of the frame to impart a lateral swinging movement to the shank and due to the shank being rotated, the blade or implement has a shearing action on the tops of the plants.

In testimony whereof he affixes his signature.

JAMES KING.